United States Patent
Kato et al.

(10) Patent No.: US 9,814,067 B2
(45) Date of Patent: Nov. 7, 2017

(54) WIRELESS COMMUNICATION SYSTEM, BASE STATION APPARATUS, MOBILE STATION APPARATUS, AND RANDOM ACCESS METHOD

(75) Inventors: Yasuyuki Kato, Osaka (JP); Shohei Yamada, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 853 days.

(21) Appl. No.: 13/388,926

(22) PCT Filed: Aug. 3, 2010

(86) PCT No.: PCT/JP2010/063121
§ 371 (c)(1),
(2), (4) Date: Mar. 22, 2012

(87) PCT Pub. No.: WO2011/016460
PCT Pub. Date: Feb. 10, 2011

(65) Prior Publication Data
US 2012/0172048 A1    Jul. 5, 2012

(30) Foreign Application Priority Data
Aug. 6, 2009  (JP) ................................. 2009-183032

(51) Int. Cl.
*H04W 74/08* (2009.01)
*H04W 74/00* (2009.01)
*H04L 5/00* (2006.01)

(52) U.S. Cl.
CPC ......... *H04W 74/008* (2013.01); *H04L 5/0007* (2013.01); *H04L 5/0053* (2013.01); *H04W 74/0833* (2013.01)

(58) Field of Classification Search
USPC ........ 370/319, 329–337, 343–344, 436–437, 370/462, 465, 480–481, 496
See application file for complete search history.

(56) References Cited

U.S. PATENT DOCUMENTS

| 8,219,097 | B2 * | 7/2012 | Park | H04W 74/006 370/338 |
| 8,620,335 | B2 * | 12/2013 | Lindstrom | H04L 5/001 370/252 |

(Continued)

FOREIGN PATENT DOCUMENTS

JP      2008-219852 A    9/2008

OTHER PUBLICATIONS

3GPP TR 36.814 V0.4.1(Feb. 2009), 3rd Generation Partnership Project; Technical Specification Group Radio Access Network; Further Advancements for E-UTRA Physical Layer Aspects (Release 9).

(Continued)

*Primary Examiner* — Jeffrey M Rutkowski
*Assistant Examiner* — Jonathan B Wood
(74) *Attorney, Agent, or Firm* — Birch, Stewart, Kolasch & Birch, LLP

(57) ABSTRACT

A random access instructed by a base station apparatus and having a small delay is enabled in Advanced-EUTRA system. Upon detection of control data in any one of a plurality of component carriers, component carrier information, a preamble number, and random access channel information are extracted from the control data, and if the extracted information indicates dedicated preamble transmission, a random access channel position to be used is selected from information on random access of a component carrier specified in the component carrier information and the random access channel information, a random access preamble is generated from the information on random access and the (Continued)

dedicated preamble number, and the random access preamble is transmitted at the random access channel position.

10 Claims, 12 Drawing Sheets

(56) References Cited

U.S. PATENT DOCUMENTS

| | | | |
|---|---|---|---|
| 2008/0232317 A1* | 9/2008 | Jen | H04W 74/002 370/329 |
| 2008/0232329 A1* | 9/2008 | Jen | 370/335 |
| 2008/0318578 A1* | 12/2008 | Worrall | 455/437 |
| 2009/0073944 A1* | 3/2009 | Jiang et al. | 370/338 |
| 2009/0111445 A1* | 4/2009 | Ratasuk et al. | 455/418 |
| 2009/0175243 A1* | 7/2009 | Han et al. | 370/335 |
| 2009/0175292 A1* | 7/2009 | Noh et al. | 370/462 |
| 2009/0191874 A1* | 7/2009 | Du et al. | 455/436 |
| 2009/0316638 A1* | 12/2009 | Yi | H04W 74/002 370/329 |
| 2010/0074246 A1* | 3/2010 | Harada | H04W 56/0045 370/350 |
| 2010/0113081 A1* | 5/2010 | Ishii | H04W 74/0866 455/509 |
| 2010/0195636 A1* | 8/2010 | Nakashima | H04W 72/12 370/342 |
| 2010/0208696 A1* | 8/2010 | Lee | H04W 36/0055 370/331 |
| 2010/0240372 A1* | 9/2010 | Wu | H04W 76/025 455/436 |
| 2010/0260136 A1* | 10/2010 | Fan et al. | 370/330 |
| 2010/0285809 A1* | 11/2010 | Lindstrom et al. | 455/450 |
| 2010/0296467 A1* | 11/2010 | Pelletier et al. | 370/329 |
| 2010/0322096 A1* | 12/2010 | Hsu et al. | 370/252 |
| 2010/0322158 A1* | 12/2010 | Lee | H04L 5/001 370/329 |
| 2011/0096748 A1* | 4/2011 | Meyer | H04W 74/006 370/329 |
| 2011/0110441 A1* | 5/2011 | Chen | H04L 5/0007 375/260 |
| 2011/0134862 A1* | 6/2011 | Huang | H04W 74/08 370/329 |
| 2011/0158351 A1* | 6/2011 | Gorokhov | H04B 7/0417 375/316 |
| 2011/0170503 A1* | 7/2011 | Chun | H04W 74/006 370/329 |
| 2011/0235609 A1* | 9/2011 | Ahn | H04L 5/0007 370/329 |
| 2011/0243087 A1* | 10/2011 | Ahn | H04W 52/146 370/329 |
| 2011/0261752 A1* | 10/2011 | Fischer et al. | 370/328 |
| 2011/0317777 A1* | 12/2011 | Huang et al. | 375/259 |
| 2012/0002617 A1* | 1/2012 | Vujcic | H04W 74/002 370/329 |
| 2012/0002643 A1 | 1/2012 | Chung et al. | |
| 2012/0069793 A1* | 3/2012 | Chung et al. | 370/315 |
| 2012/0076042 A1* | 3/2012 | Chun et al. | 370/252 |
| 2012/0106460 A1* | 5/2012 | Yang et al. | 370/328 |
| 2012/0113939 A1* | 5/2012 | Kim | H04W 74/006 370/329 |

OTHER PUBLICATIONS

3GPP TS 36.300 V8.8.0 (Mar. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TS 36.321 V8.5.0 (Mar. 2009), 3rd Generation Partnership Project; Technical Specification Group Radio Access Network; Evolved Universal Terrestrial Radio Access (E-UTRA) Medium Access Control (MAC) protocol specification (Release 8).

3GPP TSG RAN WG1#57, "Resolving LTE—A downlink carrier amiguity with RACH", LG Electronics, San Francisco, USA, May 4-8, 2009.

International Search Report, PCT/JP2010/063121, Oct. 12, 2010.

Catt, "Impact of CA on MAC layer," 3GPP TSG RAN WG2 meeting #66bis R2-093723, Los Angeles, USA Jun. 29-Jul. 3, 2009.

Supplementary European Search Report for EP Patent Application No. 10806459.3, dated Nov. 26, 2012.

Zte, "Intial Uplink Access Procedure in LTE-Advanced," 3GPP TSG RAN WG1 Meeting #56, R1-090879, Athens, Greece, Feb. 9-13, 2009.

* cited by examiner

WIRELESS COMMUNICATION SYSTEM, BASE STATION APPARATUS, MOBILE STATION APPARATUS, AND RANDOM ACCESS METHOD

TECHNICAL FIELD

The present invention relates to a base station apparatus, a mobile station apparatus, and a wireless communication system, and particularly to a wireless communication system, a base station apparatus, a mobile station apparatus and a random access method in random access operation.

BACKGROUND ART

In 3GPP (3rd Generation Partnership Project), W-CDMA system has been standardized as the third generation cellular mobile communication system and sequentially put into service. In addition, HSDPA with a still higher communication speed has been standardized and put into service.

In 3GPP, on the other hand, standardization of Evolved Universal Terrestrial Radio Access (referred to as "EUTRA", in the following) is underway. As the downlink communication system of EUTRA, OFDM (Orthogonal Frequency Division Multiplexing) system which is robust against multi-path interference and suitable for high-speed transmission has been adopted. In addition, as the uplink communication method, DFT (Discrete Fourier Transform)-spread OFDM system of an SC-FDMA (Single Carrier-Frequency Division Multiple Access) system which can reduce PAPR (Peak to Average Power Ratio) of transmission signals has been employed, considering the cost and power consumption of the mobile station apparatus.

Additionally, in 3GPP, discussions on Advanced-EUTRA, a further evolution of EUTRA, have begun. In Advanced-EUTRA, it is assumed to perform communication at a maximum downlink transmission rate of 1 Gbps or more and a maximum uplink transmission rate of 500 Mbps or more, using a band with a bandwidth of up to 100 MHz for each of uplink and downlink.

It is considered in Advanced-EUTRA to realize a 100 MHz band by bundling a plurality of 20 MHz bands of EUTRA so that mobile station apparatuses of EUTRA can also be accommodated. In Advanced-EUTRA, a band of EUTRA not exceeding 20 MHz is referred to as a Component Carrier (CC) (see non-patent document 3).

Non-patent document 1: 3GPP TS (Technical Specification) 36.300, V8.80 (2009-03), Evolved Universal Terrestrial Radio Access (E-UTRA) and Evolved Universal Terrestrial Radio Access Network (E-UTRAN), Overall description Stage2

Non-patent document 2: 3GPP TS (Technical Specification) 36.321, V8.50 (2009-03), Evolved Universal Terrestrial Radio Access (E-UTRA) Medium Access Control (MAC) protocol specification Non-patent document 3: 3GPP TR (Technical Specification) 36.814, V0.41 (2009-02), Evolved Universal Terrestrial Radio Access (E-UTRA) Radio Resource Control (RRC) Protocol specification

DISCLOSURE OF THE INVENTION

In EUTRA, a base station apparatus and a mobile station apparatus communicate using one set of uplink and downlink carriers. Accordingly, the base station apparatus instructs random access to the mobile station apparatus in one downlink carrier, and the mobile station apparatus transmits a random access preamble in an uplink carrier corresponding to the downlink carrier that received the random access instruction.

In EUTRA, however, random access is instructed with a time delay because there is only one downlink carrier, and thus control data indicating a random access instruction cannot be sent if the downlink is congested and there is no vacant radio resource. A similar phenomenon also occurs with Advanced-EUTRA if the procedure of EUTRA is used, which results in a delay in the course of completing uplink synchronization, the delay further raising a problem of delayed data transmission from the base station apparatus.

It is an object of the present invention, made in view of the above circumstances, to provide a wireless communication system, a base station apparatus, a mobile station apparatus, and a random access method allowing a random access instruction without delay to the Advanced-EUTRA System.

(1) In order to achieve the object described above, the present invention has taken the following measures. That is, a wireless communication system of the present invention is a wireless communication system in which a base station apparatus allocates a plurality of component carriers to a mobile station apparatus and communicates with the mobile station apparatus, and the mobile station apparatus transmits a random access preamble to a random access channel even during communication with the base station apparatus, wherein the base station apparatus selects a component carrier from among component carriers allocated to the mobile station apparatus, a dedicated preamble, and a random access channel to be used for random access preamble transmission among random access channels associated with the component carrier, prepares control data including information of the selected component carrier, a number of the selected dedicated preamble, and information of the selected random access channel, and transmits the control data to a mobile station apparatus using any one of the plurality of allocated component carriers; and wherein the mobile station apparatus, when detecting the control data in any one of the plurality of component carriers, extracts component carrier information, a preamble number, and random access channel information from the control data, and if the extracted information indicates dedicated preamble transmission, selects a random access channel position to be used from information on random access of a component carrier specified in the component carrier information and the random access channel information, and generates a random access preamble from the information on random access and the dedicated preamble number, and transmits the random access preamble at the random access channel position.

Accordingly, since the base station apparatus selects a component carrier from component carriers allocated to the mobile station apparatus, a dedicated preamble, and a random access channel to be used for random access preamble transmission among random access channels associated with the component carrier, prepares control data including information of the selected component carrier, a number of the selected dedicated preamble, and information of the selected random access channel, and transmits the control data to the mobile station apparatus using any one of the plurality of allocated component carriers, it becomes possible to instruct dedicated preamble random access even if the component carrier instructed by the base station apparatus to perform random access with the dedicated preamble is different from the component carrier transmitting the control data, and thus control data indicating a random access instruction can be transmitted without occurrence of transmission delay even if the downlink control channel of a particular component carrier is congested. In addition, since the control data of the base station apparatus is not limited with regard to its allocation, the degree of freedom of scheduling increases, and scheduling is facilitated. Furthermore, the mobile station apparatus extracts component carrier information, a preamble number, and random access channel information from the control data, selects a position of the random access channel to be used from the information on random access of a component carrier specified in the component carrier information and the random access channel information, generates a random access preamble from the information on random access and the dedicated preamble number, and transmits the random access preamble at the random access channel position, and thereby the mobile station apparatus can perform random access with the dedicated preamble using the component carrier specified by the base station apparatus, which is different from the component carrier that received the control data.

(2) Additionally, in the wireless communication system of the present invention, the base station apparatus prepares control data indicating random preamble transmission, and transmits the control data to a mobile station apparatus using any one of the plurality of component carriers, and wherein the mobile station apparatus, when detecting the control data in any one of the plurality of component carriers, extracts component carrier information, a preamble number, and random access channel information from the control data, and if the extracted information indicates random preamble transmission, the mobile station apparatus selects a component carrier, a random access channel position, and a random preamble to be used, and generates a random access preamble from information on random access of the selected component carrier and the random preamble, and transmits the random access preamble at the random access channel position.

Accordingly, by preparing control data indicating random preamble transmission and transmitting the control data to the mobile station apparatus using any one of the plurality of component carriers, the base station apparatus can freely select, from among the component carriers allocated to the mobile station apparatus, control data indicating a random access instruction with a random preamble, and thereby the base station apparatus can transmit the control data indicating the random access instruction without occurrence of transmission delay. Furthermore, if the component carrier information, the preamble number, and the random access channel information have been extracted from the control data, and the extracted information indicates random preamble transmission, the mobile station apparatus can perform random access according to the instruction from the base station apparatus by selecting the component carrier, the random access channel position, and the random preamble to be used, generating the random access preamble from the information on random access of the selected component carrier and the random preamble, and transmitting the random access preamble at the random access channel position.

(3) Additionally, in the wireless communication system of the present invention, at least one of the preamble number, the random access channel information, and the component carrier information in the control data indicating random preamble transmission has a fixed value.

Accordingly, by setting at least one of the preamble number, the random access channel information, and the component carrier information to a fixed value in the control data indicating random preamble transmission, dedicated preamble transmission and random preamble transmission can be indicated by a single format of control data instructing random access.

(4) Additionally, in the wireless communication system of the present invention, if component carrier information of the control data does not have a fixed value, a random access channel position and a random preamble to be used are selected based on information on random access of a component carrier specified by the component carrier information, a random access preamble is generated from the information on random access and the random preamble, and the random access preamble is transmitted at the random access channel position.

Accordingly, if component carrier information of the control data does not have a fixed value, it is possible to select a random access channel position and a random preamble to be used, based on information on random access of the component carrier specified by the component carrier information, generate a random access preamble from the information on random access and the random preamble, and transmit the random access preamble at the random access channel position.

(5) A base station apparatus of the present invention is a base station apparatus which allocates a plurality of component carriers to a mobile station apparatus and receives a random access preamble from the mobile station apparatus during communication with the mobile station apparatus, wherein the base station apparatus selects one of the component carriers allocated to the mobile station apparatus, a dedicated preamble, and a random access channel to be used for random access preamble transmission among random access channels associated with the component carrier, prepares control data including information of the selected component carrier, a number of the selected dedicated preamble, and information of the selected random access channel, and transmits the control data to the mobile station apparatus using any one of the plurality of allocated component carriers.

Accordingly, it becomes possible to instruct dedicated preamble random access even if the component carrier instructed by the base station apparatus to perform random access with the dedicated preamble is different from the component carrier transmitting the control data, and thus control data indicating a random access instruction can be transmitted without occurrence of transmission delay even if the downlink control channel of a particular component carrier is congested. In addition, since the control data of the base station apparatus is not limited with regard to its allocation, the degree of freedom of scheduling increases and scheduling is facilitated.

(6) In addition, the base station apparatus of the present invention prepares control data instructing random preamble transmission, and transmits the control data to the mobile station apparatus using any one of the plurality of component carriers.

Accordingly, since the base station apparatus can freely select, from among the component carriers allocated to the mobile station apparatus, control data indicating a random access instruction with a random preamble, the base station apparatus can transmit the control data indicating the random access instruction without occurrence of transmission delay.

(7) A mobile station apparatus of the present invention is a mobile station apparatus which has a plurality of component carriers allocated by a base station apparatus and transmits a random access preamble to a random access channel even during communication with the base station apparatus, wherein the mobile station apparatus, when detecting control data in any one of the plurality of component carriers, extracts component carrier information, a preamble number, and random access channel information from the control data, and if the extracted information indicates dedicated preamble transmission, selects a random access channel position to be used from information on random access of a component carrier specified in the component carrier information and the random access channel information, generates a random access preamble from the information on random access and the dedicated preamble number, and transmits the random access preamble at the random access channel position.

Accordingly, the mobile station apparatus can perform random access with the dedicated preamble using the component carrier specified by the base station apparatus, which is different from the component carrier that received the control data, by extracting component carrier information, a preamble number, and random access channel information from control data when detecting the control data in any one of the plurality of component carriers and, if the extracted information indicates dedicated preamble transmission, selecting a random access channel position to be used from information on random access of a component carrier specified in the component carrier information and the random access channel information, generating a random access preamble from the information on random access and the dedicated preamble number, and transmitting the random access preamble at the random access channel position.

(8) In addition, if the extracted information indicates random preamble transmission, the mobile station apparatus of the present invention selects a component carrier, a random access channel position, and a random preamble to be used, generates a random access preamble from the information on random access and the random preamble, and transmits the random access preamble at the random access channel position.

Accordingly, when the extracted information indicates random preamble transmission, the mobile station apparatus can perform random access in any of the component carriers allocated to the base station apparatus by selecting a component carrier, a random access channel position, and a random preamble to be used, generating a random access preamble from the information on random access of the selected component carrier and the random preamble, and transmitting the random access preamble at the random access channel position.

(9) A random access method of the present invention is a random access method in which a base station apparatus allocates a plurality of component carriers to a mobile station apparatus and communicates with the mobile station apparatus, and the mobile station apparatus transmits a random access preamble to a random access channel even during communication with the base station apparatus, the method comprising at least the steps of: in the base station apparatus, selecting a component carrier from among the component carriers allocated to the mobile station apparatus, a dedicated preamble, and a random access channel to be used for random access preamble transmission among random access channels associated with the component carrier, preparing control data including information of the selected component carrier, a number of the selected dedicated preamble, and information of the selected random access channel, and transmitting the control data to the mobile station apparatus using any one of the plurality of allocated component carriers, and in the mobile station apparatus, when detecting the control data in any one of the plurality of component carriers, extracting component carrier information, a preamble number, and random access channel information from the control data, and determining whether the extracted information indicates dedicated preamble transmission or random preamble transmission, and if the extracted information indicates dedicated preamble transmission, selecting a random access channel position to be used from information on random access of a component carrier specified in the component carrier information and the random access channel information, generating a random access preamble from the information on random access and the dedicated preamble number, and transmitting the random access preamble at the random access channel position.

Accordingly, since the base station apparatus selects a component carrier from among component carriers allocated to the mobile station apparatus, a dedicated preamble, and a random access channel to be used for random access preamble transmission among random access channels associated with the component carrier, prepares control data including information of the selected component carrier, a number of the selected dedicated preamble, and information of the selected random access channel, and transmits the control data to the mobile station apparatus using any one of the plurality of allocated component carriers, it becomes possible to instruct dedicated preamble random access even if the component carrier instructed by the base station apparatus to perform random access with the dedicated preamble is different from the component carrier transmitting the control data, and thus control data indicating a random access instruction can be transmitted without occurrence of transmission delay even if the downlink control channel of a particular component carrier is congested. In addition, since the control data of the base station apparatus is not limited with regard to its allocation, the degree of freedom of scheduling increases, and scheduling is facilitated. Furthermore, the mobile station apparatus extracts component carrier information, a preamble number, and random access channel information from the control data, selects a position of the random access channel to be used from the information on random access of a component carrier specified in the component carrier information and the random access channel information, generates a random access preamble from the information on random access and the dedicated preamble number, and transmits the random access preamble at the random access channel position, and thereby the mobile station apparatus can perform random access with the dedicated preamble in the component carrier specified by the base station apparatus, which is different from the component carrier that received the control data.

(10) In addition, the random access method of the present invention further comprises at least the steps of: in the base station apparatus, preparing control data indicating random preamble transmission, and transmitting the control data to the mobile station apparatus using any one of the plurality of component carriers, and in the mobile station apparatus, when detecting the control data in any one of the plurality of component carriers, extracting component carrier information, a preamble number, and random access channel information from the control data, and determining whether the extracted information indicates dedicated preamble transmission or random preamble transmission, and if the extracted information indicates random preamble transmission, selecting a component carrier, a random access channel position, and a random preamble to be used, generating a random access preamble from the information on random access of the component carrier and the random preamble, and transmitting the random access preamble at the random access channel position.

Accordingly, by preparing control data indicating random preamble transmission and transmitting the control data to the mobile station apparatus using any one of the plurality of component carriers, the base station apparatus can freely select, from the component carriers allocated to the mobile station apparatus, control data indicating a random access instruction with a random preamble, and thereby the base station apparatus can transmit the control data indicating the random access instruction without occurrence of transmission delay. Furthermore, if the component carrier information, the preamble number, and the random access channel information have been extracted from the control data, and the extracted information indicates random preamble transmission, the mobile station apparatus can perform random access according to the instruction from the base station apparatus by selecting the component carrier, the random access channel position, and the random preamble to be used, generating the random access preamble from the information on random access of the selected component carrier and the random preamble, and transmitting the random access preamble at the random access channel position.

According to the present invention, in the Advanced-EUTRA system, the degree of freedom of scheduling of the control data instructing random access by the base station apparatus increases, and random access instruction is facilitated.

BEST MODES FOR CARRYING OUT THE INVENTION

OFDM system has been proposed for the downlink of EUTRA. In addition, a single carrier communication system, which is DFT-spread OFDM system, has been proposed for the uplink of EUTRA.

The downlink of EUTRA includes a DPiCH (Downlink Pilot Channel), a DSCH (Downlink Synchronization Channel), a PDSCH (Physical Downlink Shared Channel), a PDCCH (Physical Downlink Control Channel), and a CCPCH (Common Control Physical Channel).

Figure 1:
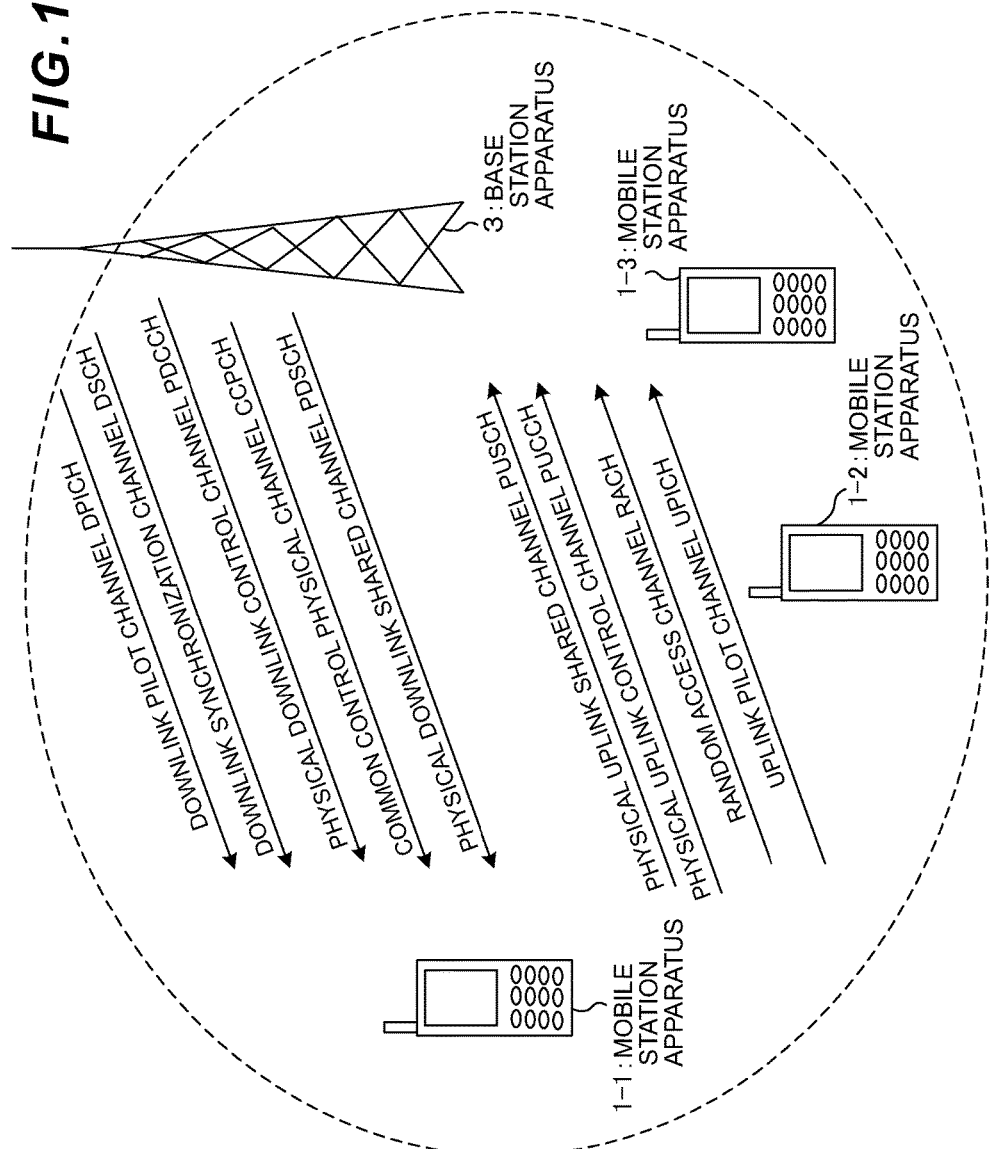
FIG. 1 illustrates a channel configuration in EUTRA.
Figure 2:
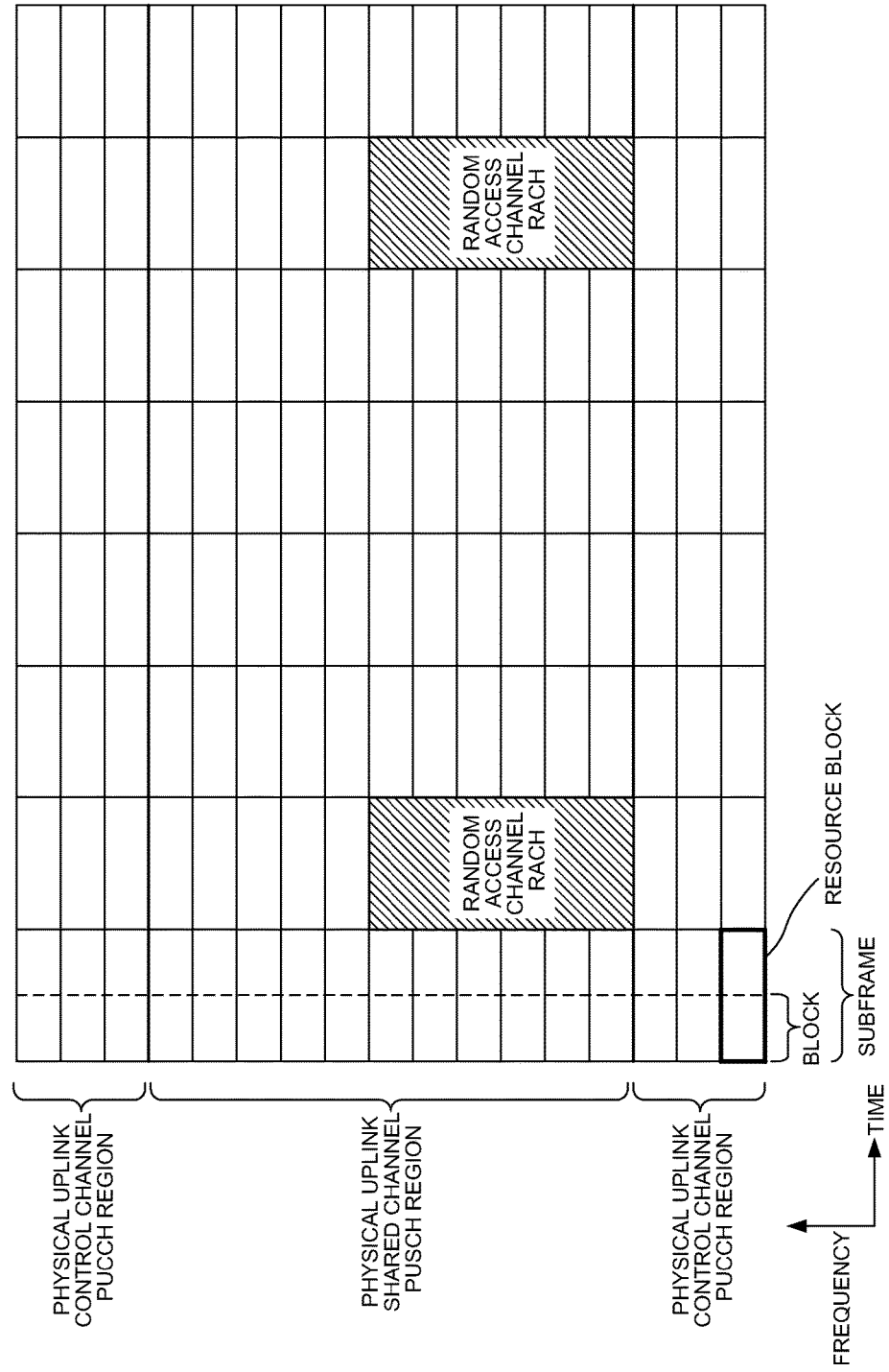
FIG. 2 illustrates an uplink configuration in EUTRA.

The uplink of EUTRA includes an UPiCH (Uplink Pilot Channel), RACH (Random Access Channel), a PUSCH (Physical Uplink Shared Channel), and a PUCCH (Physical Uplink Control Channel) (see non-patent document 1). FIG. 1 illustrates a channel configuration in EUTRA, and FIG. 2 illustrates an uplink configuration in EUTRA. One block includes twelve subcarriers and seven OFDM symbols. One resource block is made up using two blocks. With regard to the random access channel RACH, one random access channel is prepared in a subframe to support accesses from many mobile station apparatuses, for example, mobile station apparatuses 1-1 to 1-3. In the following, the mobile station apparatuses 1-1 to 1-3 are collectively referred to as a mobile station apparatus 1.

The configuration of the random access channel RACH (frequency position and time position) is notified to the mobile station apparatus 1 as broadcast information from a base station apparatus 3. The random access channel is provided regularly, in which the random access channel RACH, the region of the uplink shared channel PUSCH, and the region of the uplink control channel PUCCH are divided as illustrated. Here, the random access channel RACH is made up using six resource blocks (see non-patent document 1). The purpose of using the random access channel is to provide synchronization between the mobile station apparatus 1 and the base station apparatus 3 (adjust the transmission timing from the mobile station apparatus 1 to the base station apparatus 3) in the uplink.

There are two access procedures for random access: Contention based Random Access and Non-contention based Random Access.

Figure 3:
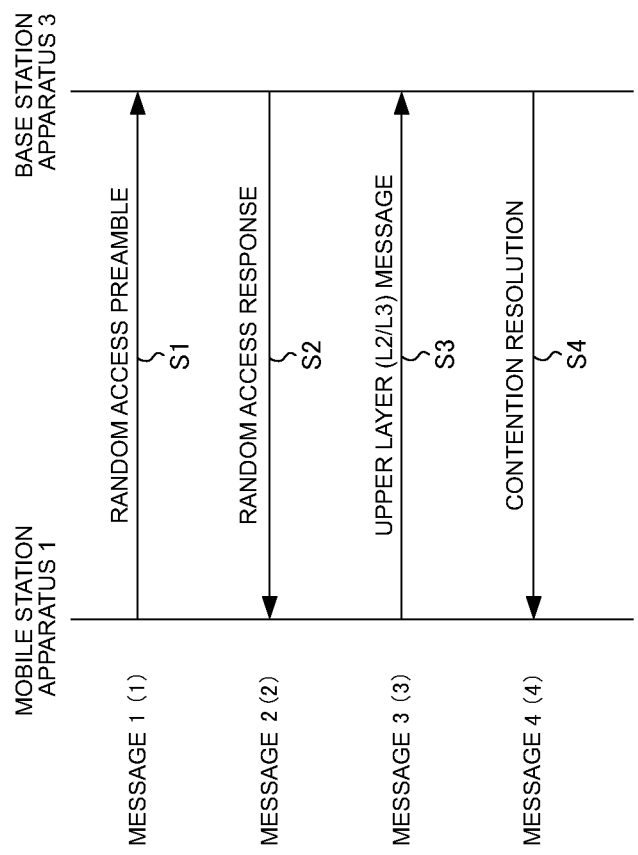
FIG. 3 illustrates a procedure of Contention based Random Access.

FIG. 3 illustrates the procedure of the Contention based Random Access. The Contention based Random Access is a random access with a possibility of contention among the mobile station apparatuses 1, and a random access performed at the time of the initial access or a scheduling request.

Figure 4:
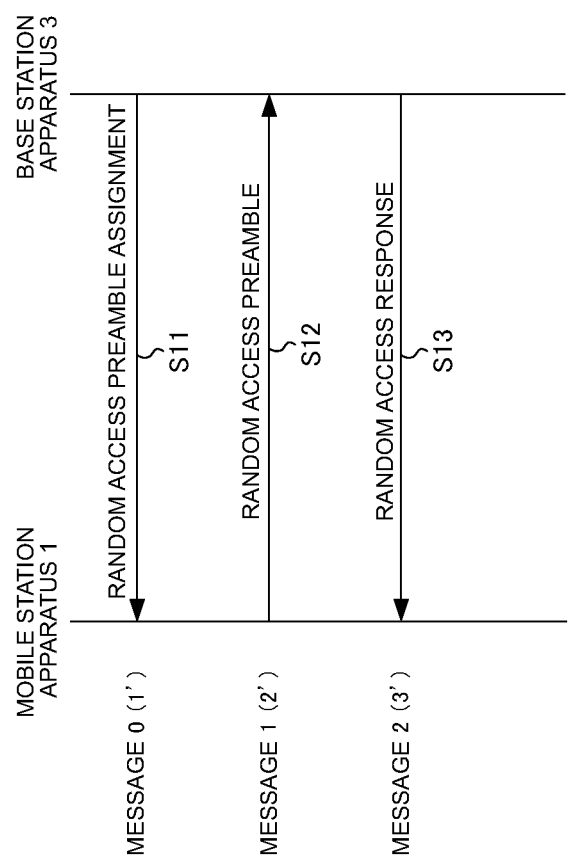
FIG. 4 illustrates a procedure of Non-contention based Random Access.

FIG. 4 illustrates the procedure of the Non-contention based Random Access. The Non-contention based Random Access is a random access in which no contention occurs among the mobile station apparatuses 1, and the mobile station apparatus 1 starts the random access by instruction from the base station apparatus 3 in a special case such as when hand-over or the transmission timing of the mobile station apparatus 1 is not effective in order to quickly provide synchronization between the mobile station apparatus 1 and the base station apparatus 3 while the base station apparatus 3 and the mobile station apparatus 1 are communicating (see non-patent document 1). Here, the Non-contention based Random Access is instructed by a message of the RRC (Radio Resource Control) layer and control data of the downlink control channel PDCCH.

When the mobile station apparatus 1 accesses the random access channel RACH, only a random preamble is transmitted. A random access preamble includes a preamble part and a CP (Cyclic Prefix) part. In the preamble part, CAZAC (Constant Amplitude Zero Auto-Correlation Zone Code) sequences which are signal patterns expressing information are used, and 64 sequences are prepared to express 6-bit information.

Figure 5:
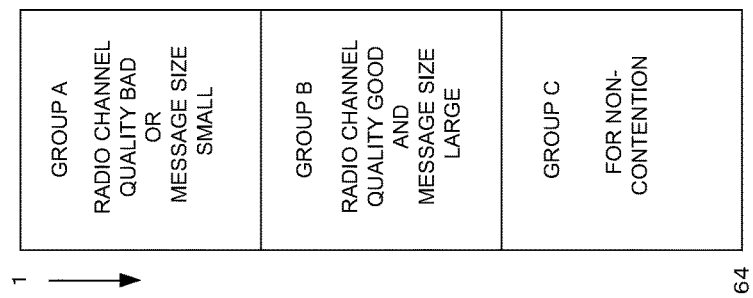
FIG. 5 illustrates an exemplary sequence group in EUTRA.

FIG. 5 illustrates an exemplary sequence group in EUTRA. The 64 sequences are divided into three sequence groups according to their usage. The sequences of group A and group B are selected in the case where the mobile station apparatus 1 selects sequences by itself to perform random access. The sequence of group A is selected for the mobile station apparatus 1 when the path loss between the mobile station apparatus 1 and the base station apparatus 3 is large (bad radio channel quality), or when transmission capacity of the message 3 is small. The sequence of group B is selected for the mobile station apparatus 1 when the path loss between the mobile station apparatus 1 and the base station apparatus 3 is small (good radio channel quality) and further the transmission capacity of the message 3 is large. The sequence of group C is notified to the mobile station apparatus 1 from the base station apparatus 3 when using the Non-contention based Random Access procedure. Here, the number of sequences in each group is variable, and information on the number of sequences in each group or information on sequences is broadcasted from the base station apparatus 3. Here, sequences of group A and group B selected at random by the mobile station apparatus 1 are referred to as random sequences (random preambles), and sequences of group C notified to the mobile station apparatus 1 by the base station apparatus 3 are referred to as dedicated sequences (dedicated preambles).

Referring to FIG. 3, the Contention based Random Access procedure will be briefly explained. First, among the mobile station apparatuses 1, the mobile station apparatus 1 transmits a random access preamble to the base station apparatus 3 (message 1: (1) step S1). The base station apparatus 3 which received the random access preamble then transmits, to the mobile station apparatus 1, a response (random access response) to the random access preamble (message 2: (2) step S2). The mobile station apparatus 1 transmits a message (message 3: (3) step S3) of the upper layer (Layer2/Layer3) based on the scheduling information included in the random access response. The base station apparatus 3 transmits a contention acknowledgement message (message 4: (4) step S4) to the mobile station apparatus 1 which has succeeded in receiving the upper layer message of (3). Here, the Contention based Random Access is also referred to as random preamble transmission.

Referring to FIG. 4, the Non-contention based Random Access procedure will be briefly explained. First, the base station apparatus 3 notifies the mobile station apparatus 1 of the preamble number (or the sequence number) and the random access channel number to be used (message 0: (1)', step S11). The mobile station apparatus 1 transmits the random access preamble of the specified preamble number to the specified random access channel RACH (message 1: (2)', step S12). The base station apparatus 3 which received the random access preamble then transmits, to the mobile station apparatus 1, a response (random access response) to the random access preamble (message 2: (3)', step S13). However, if the value of the notified preamble number is 0, the Contention based Random Access will be performed. Here, the Non-contention based Random Access is also referred to as dedicated preamble transmission.

Referring to FIG. 3, the Contention based Random Access procedure will be specifically explained. First, the mobile station apparatus 1 selects a sequence group based on the downlink path loss and the size of the message 3. The mobile station apparatus 1 selects a CAZAC sequence at random from the selected sequence group, generates a random access preamble based on the selected CAZAC sequence, and transmits the random access preamble in the random access channel RACH (message 1: (1)).

Upon detecting the random access preamble from the mobile station apparatus 1, the base station apparatus 3 calculates from the random access preamble the amount of transmission timing gap between the mobile station apparatus 1 and the base station apparatus 3, performs scheduling (specification of uplink radio resource position, transmission format (message size), or the like) for transmitting an L2/L3 message, allocates a Temporary C-RNTI (Cell-Radio Network Temporary Identity), places an RA-RNTI indicating the response (random access response) addressed to the mobile station apparatus 1 which has transmitted the random access preamble of the random access channel RACH to the downlink control channel PDCCH, and transmits, to the downlink shared channel PDSCH, the random access response message (message 2: (2)) including the transmission timing gap information, the scheduling information, the Temporary C-RNTI, and the preamble number (sequence number) of the received preamble.

Upon detecting that there is an RA-RNTI in the downlink control channel PDCCH, the mobile station apparatus 1 checks the contents of the random access response message provided in the downlink shared channel PDSCH and, if the preamble number corresponding to the transmitted random access preamble is included therein, extracts the message information, corrects the transmission timing gap, and transmits the L2/L3 message (message 3: (3)) including information such as the C-RNTI (or Temporary C-RNTI) or IMSI (International Mobile Subscriber Identity) identifying the mobile station apparatus 1 with the scheduled radio resource and the transmission format. If the transmission timing gap is corrected, a timer is started in which the corrected transmission timing is effective and, when this timer expires, the transmission timing becomes ineffective. Data transmission from the mobile station apparatus is possible while the transmission timing is effective, whereas only the transmission of the random access preamble is allowed in uplink transmission if the transmission timing is ineffective.

Here, the mobile station apparatus 1 keeps waiting for a random access response message from the base station apparatus 3 for a certain period and, if no random access response message including the preamble number of the transmitted random access preamble has been received, transmits the random access preamble again.

Upon receiving the L2/L3 message from the mobile station apparatus 1, the base station apparatus 3 transmits a contention resolution message (message 4: (4)) to the mobile station apparatus 1-1 for determining whether or not contention has occurred between the mobile station apparatuses 1-1 and 1-3 using the C-RNTI (or Temporary C-RNTI) or IMSI included in the received L2/L3 message.

Here, if the mobile station apparatus 1 has not detected a random access response message including the preamble number corresponding to the transmitted random access preamble for a certain period, has failed in transmitting the message 3, or has not detected the identification information of its own mobile station apparatus 1 in the contention confirmation message for a certain period, restarts from transmission of the random access preamble (message 1: (1)) (see non-patent document 2). Furthermore, control data for connection between the base station apparatus 3 and the mobile station apparatus 1 will be exchanged after the random access procedure has completed.

Additionally, in 3GPP, discussions on Advanced-EUTRA, a further evolution of EUTRA, have begun. In Advanced-EUTRA, it is assumed to perform communication with a maximum downlink transmission rate of 1 Gbps or more and an uplink transmission rate of 500 Mbps or more, using bands with a maximum bandwidth of 100 MHz for uplink and downlink communications, respectively.

Figure 6:
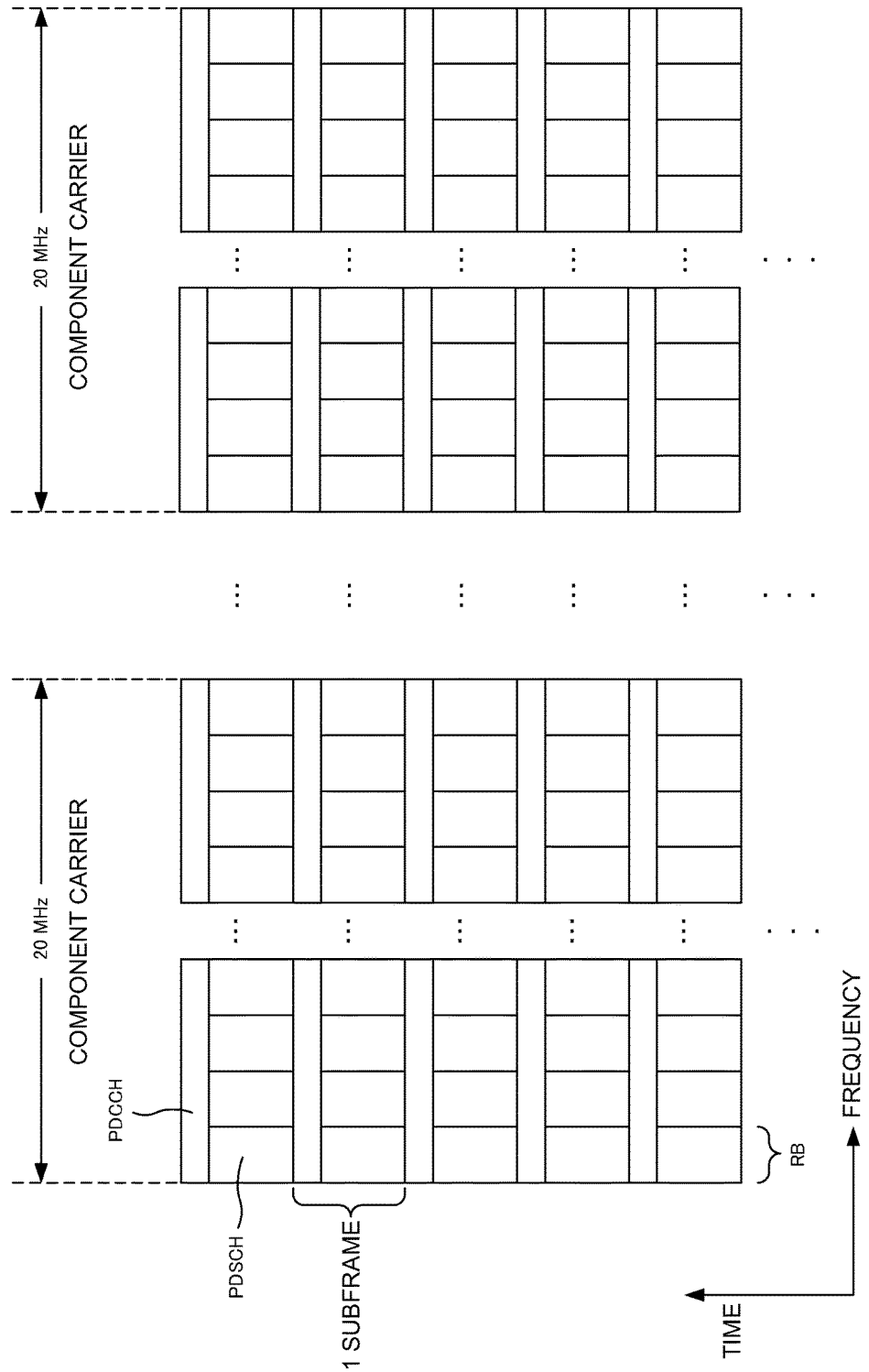
FIG. 6 is an explanatory view of a downlink component carrier in Advanced-EUTRA.
Figure 7:
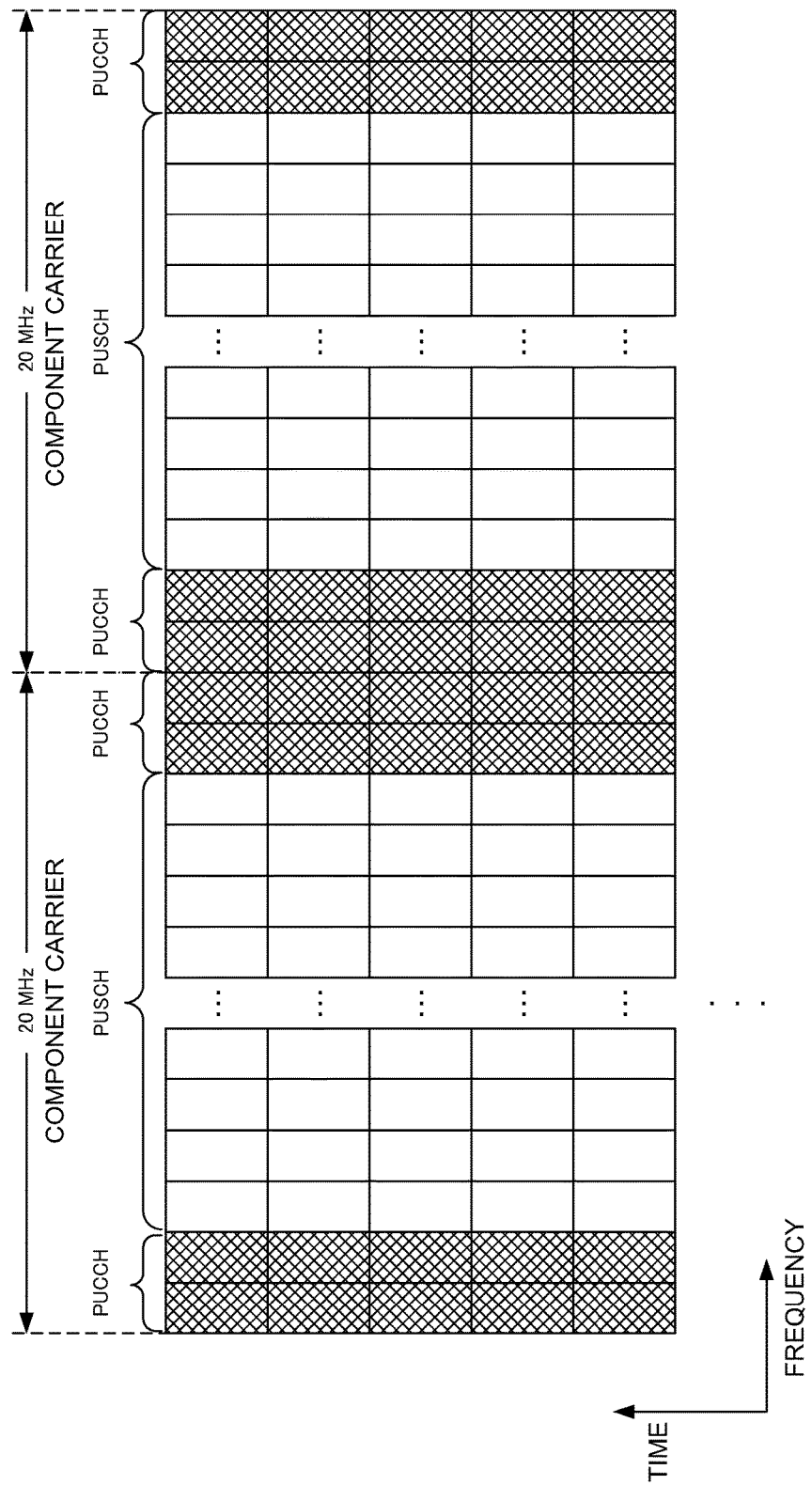
FIG. 7 is an explanatory view of an uplink component carrier in Advanced-EUTRA.

FIG. 6 is an explanatory view of a downlink component carrier in Advanced-EUTRA. FIG. 7 is n explanatory view of an uplink component carrier in Advanced-EUTRA.

It is considered in Advanced-EUTRA to realize a 100 MHz band by bundling a plurality of 20 MHz bands of EUTRA so that the mobile station apparatus 1 of EUTRA can also be accommodated. In Advanced-EUTRA, a band of EUTRA not exceeding 20 MHz is referred to as a Component Carrier (CC) (see non-patent document 3).

The base station apparatus 3 allocates, from a plurality of component carriers, one or more component carriers matching the communication capacity and communication condition of the mobile station apparatus 1, and the mobile station apparatus 1 transmits and receives data with the allocated component carrier.

Explanation of Configuration

Figure 8:
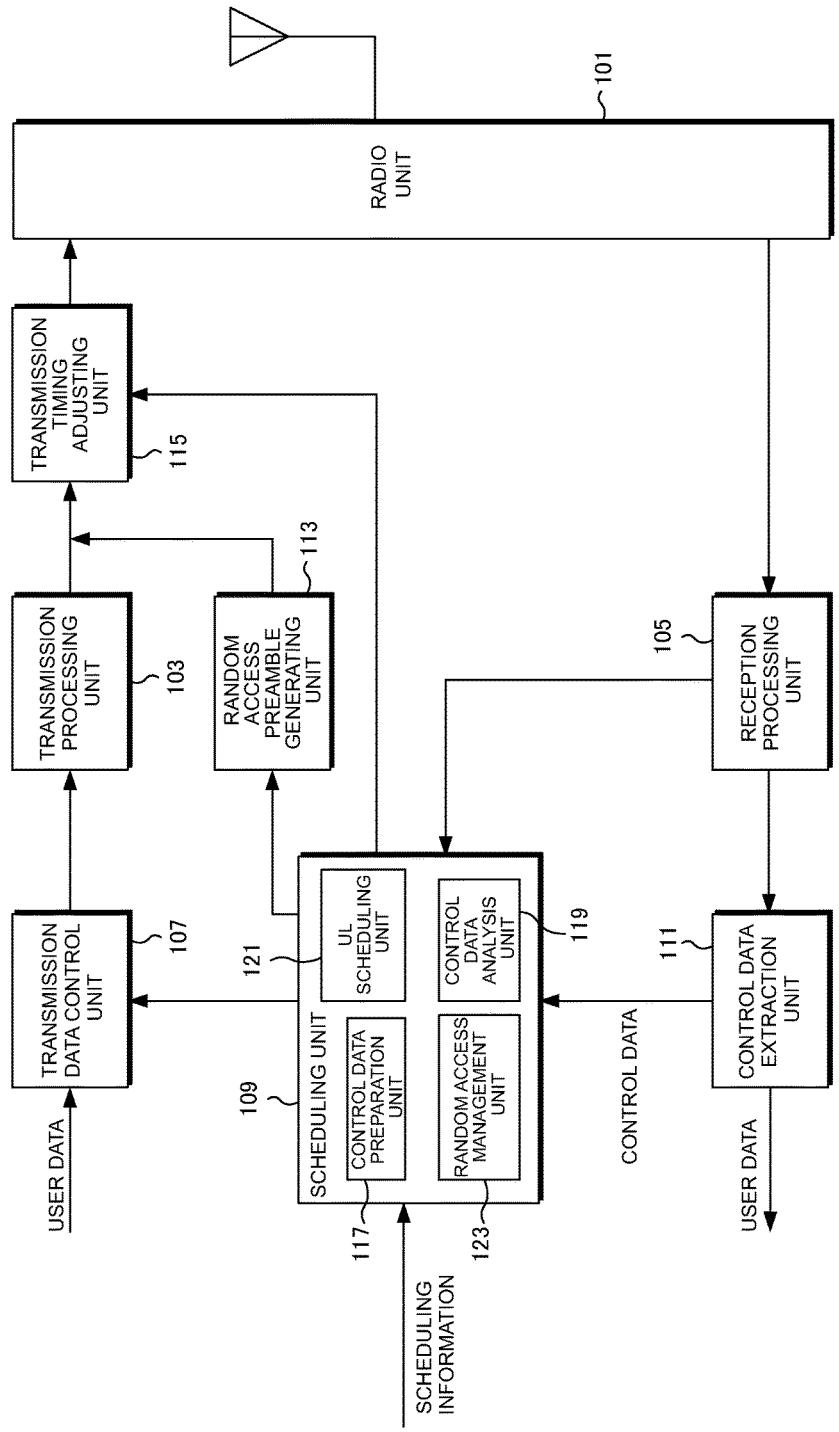
FIG. 8 illustrates a configuration of a mobile station apparatus according to an embodiment of the present invention.

FIG. 8 illustrates a configuration of the mobile station apparatus 1 according to an embodiment of the present invention. The mobile station apparatus 1 comprises a radio unit 101, a transmission processing unit 103, a reception processing unit 105, a transmission data control unit 107, a scheduling unit 109, a control data extraction unit 111, a random access preamble generation unit 113, and a transmission timing adjustment unit 115. The scheduling unit 109 comprises a control data preparation unit 117, a control data analysis unit 119, a UL scheduling unit 121, and a random access management unit 123.

User data is input to the transmission data control unit 107, and the transmission data control unit 107 allocates each data to each channel of each component carrier and transmits it to the transmission processing unit 103 according to an instruction of the scheduling unit 109. In the transmission processing unit 103, a signal from the transmission data control unit 107 is encoded and modulated. The modulated signal is subjected to DFT-IFFT (Inverse Fast Fourier Transform) processing and has a CP inserted therein. In the transmission timing adjustment unit 115, transmission timing of the data is adjusted from the transmission timing gap information passed from the scheduling unit 109 and, after the transmission timing is adjusted, up-converted to a radio frequency by the radio unit 101 and transmitted from the transmitting antenna.

The radio unit 101 down-converts the radio signal received from the antenna and passes it to reception processing unit 105. The reception processing unit 105 performs FFT (Fast Fourier Transform), decoding, demodulation processing, or the like, on the signal passed from the radio unit 101, and passed the demodulated data to the control data extraction unit 111. In addition, the reception processing unit 105 measures the downlink radio channel performances and passes the measurement result to the scheduling unit 109. The control data extraction unit 111 checks the C-RNTI (mobile station apparatus identification information) and the downlink scheduling information provided in the downlink control channel PDCCH of each component carrier, determines whether or not the data is addressed to its own mobile station apparatus and, if the data is addressed to its own mobile station apparatus, divides the data of the downlink shared channel PDSCH, which has been demodulated in the reception processing unit 105, into control data and user data. The control data is passed to the scheduling unit 109, whereas the user data is passed to the upper layer. In addition, the uplink scheduling information included in the downlink control channel PDCCH is passed to the scheduling unit 109. Furthermore, if an RA-RNTI (Random Access-Radio Network Temporary Identity) is detected after having transmitted the random access preamble, a random access response message is passed to the scheduling unit 109. Moreover, the scheduling unit 109 is instructed to return a response to the received data.

The scheduling unit 109 comprises a UL scheduling unit 121, a control data analysis unit 119, a control data preparation unit 117, and a random access management unit 123, and the control data preparation unit 117 prepares control data and prepares a response to the downlink data received by the control data extraction unit 111. The control data analysis unit 119 analyzes the data from the control data extraction unit 111, passes the scheduling information of the uplink data to the UL scheduling unit 121, and passes, to the random access management unit 123 and the random access preamble generation unit 113, information on random access broadcasted from the base station apparatus 3 (information about the position, sequence information, and sequence group of the random access channel RACH), random access instruction information from the base station apparatus 3, and message contents of the random access response. The UL scheduling unit 121 controls the transmission data control unit 107 based on the scheduling information of the uplink data. In addition, random access is instructed to the random access management unit 123 based on the scheduling information from the upper layer.

The random access management unit 123 manages information about random access for each component carrier. When performing random access according to an instruction from the UL scheduling unit 121, the random access management unit 123 selects a component carrier that performs random access, selects a sequence group of sequences to be used for random access based on the downlink radio channel performances passed from the reception processing unit 105 and the transmission data size of the message 3 using the information on random access of the component carrier to be used, selects a sequence at random from the selected sequence group, and notifies the selected component carrier and the sequence number (preamble number) to the random access preamble generation unit 113. The random access management unit 123 then checks the contents of the random access response passed from the control data analysis unit 119 and, if the preamble number of the transmitted random access preamble is detected, passes the transmission timing gap information to the transmission timing adjustment unit 115, and passes the allocated radio resource information to the UL scheduling unit 121. Subsequently, upon confirmation of the contention resolution message, the random access management unit 123 terminates the random access. In addition, the component carrier number, the sequence number (preamble number), and the random access channel number to be used are extracted from the random access instruction information which has been passed from the control data analysis unit 119, and passed to the random access preamble generation unit 113. Here, the sequence selected by the mobile station apparatus 1 is denoted as a random sequence (random preamble), whereas the sequence specified by the base station apparatus 3 is denoted as a dedicated sequence (dedicated preamble).

When the component carrier number and the sequence number are notified from the scheduling unit 109, the random access preamble generation unit 113 prepares a preamble part and a CP part from the information about random access of the specified component carrier and the sequence number, generates a random access preamble, and selects a random access channel position to be used from the information on random access of the specified component carrier. When the component carrier number, the sequence number, and the random access channel number are notified from the scheduling unit 109, the random access preamble generation unit 113 prepares a preamble part and a CP part from the information about random access of the specified component carrier and the sequence number, generates a random access preamble, and selects a random access channel position to be used from the information on random access of the specified component carrier and the random access number. Subsequently, the random access preamble generation unit 113 allocates the generated random access preamble to the random access channel position which has been selected in the specified component carrier.

Figure 9:
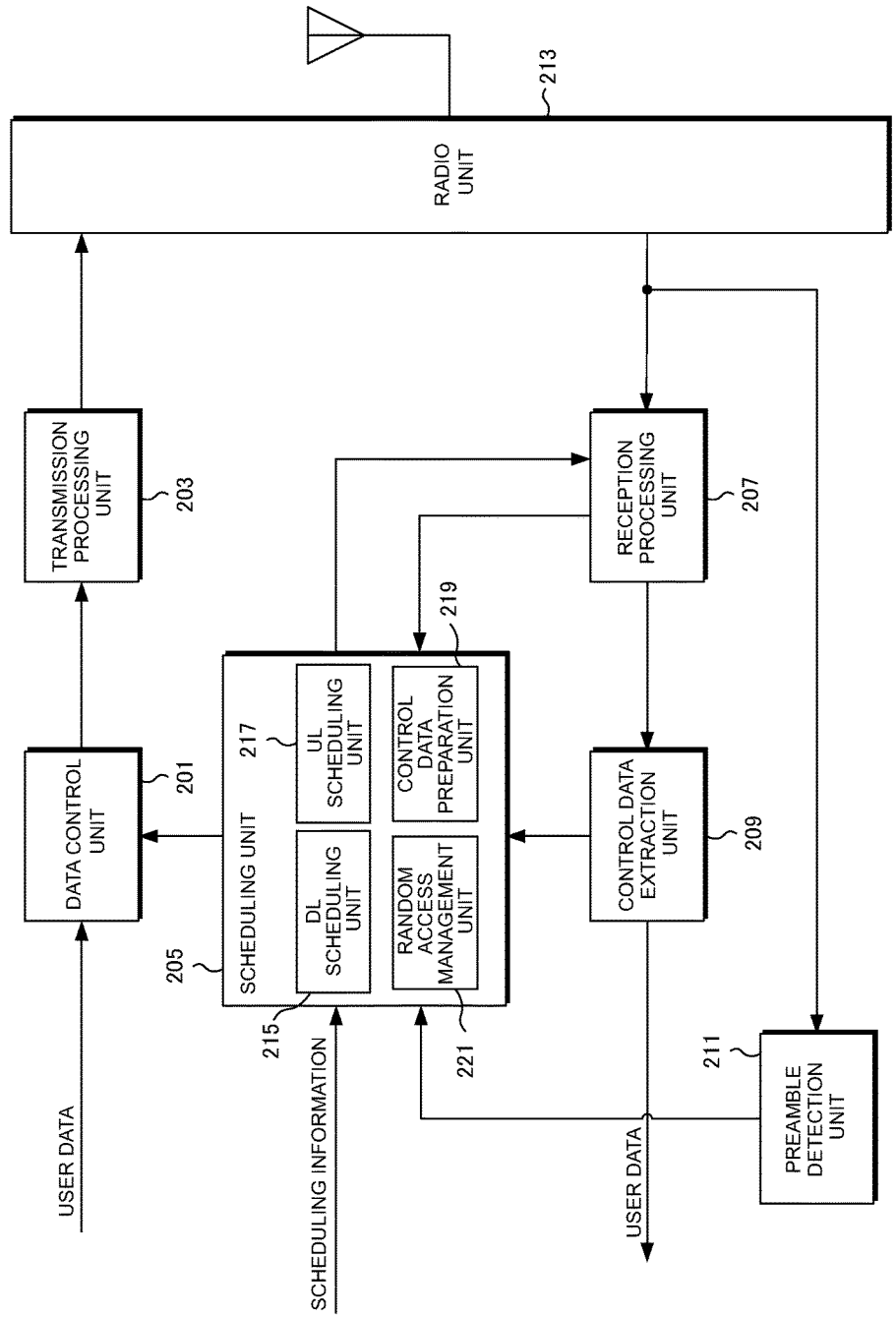
FIG. 9 illustrates a configuration of a base station apparatus according to an embodiment of the present invention.

FIG. 9 illustrates a configuration of the base station apparatus 3 according to an embodiment of the present invention. The base station comprises a data control unit 201, a transmission processing unit 203, a scheduling unit 205 (base station side scheduling unit), a reception processing unit 207, a control data extraction unit 209, a preamble detection unit 211, and a radio unit 213. The scheduling unit 205 comprises a DL scheduling unit 215, a UL scheduling unit 217, a control data preparation unit 219, and a random access management unit 221.

According to an instruction from the scheduling unit 205, the data control unit 201 maps the user data and the control data to the downlink control channel PDCCH, the downlink synchronization channel DSCH, the downlink pilot channel DPiCH, the common control channel CCPCH, and the downlink shared channel PDSCH of each component carrier, and maps the transmission data for respective mobile station apparatuses 1-1 to 1-3 to the downlink shared channel PDSCH.

The transmission processing unit 203 performs OFDM signal processing such as data modulation, serial/parallel conversion of input signals, IFFT conversion, CP insertion, filtering, or the like to generate OFDM signals. The radio unit 213 up-converts the OFDM-modulated data to a radio frequency and transmits it to the mobile station apparatus 1. In addition, the radio unit 213 receives uplink data from the mobile station apparatus 1, down-converts it to a baseband signal, and passes the received data to the reception processing unit 207 and the preamble detection unit 211. The reception processing unit 207 demodulates the data by performing a demodulation processing considering the transmission processing performed in the mobile station apparatus 1, according to the uplink scheduling information from the scheduling unit 205. In addition, the reception processing unit 207 measures the radio channel performances from the uplink pilot channel UPiCH, and passes the result to the scheduling unit 205. Here, although the uplink communication method is assumed to be a single carrier method such as DFT-spread OFDM, or the like, a multi-carrier method such as OFDM will do.

The control data extraction unit 209 checks whether or not the received data is correct, and notified the checking result to the scheduling unit 205. If the received data is correct, the received data is divided into the user data and the control data.

The scheduling unit 205 comprises a DL scheduling unit 215 which performs downlink scheduling and a UL scheduling unit 217 which performs uplink scheduling, a control data preparation unit 219, and a random access management unit 221. The DL scheduling unit 215 performs scheduling for mapping the user data and the control data to each downlink channel according to the downlink radio channel information notified from the mobile station apparatus 1, data information of each user notified from the upper layer, and control data prepared in the control data preparation unit 219. The UL scheduling unit 217 performs scheduling for mapping the user data to each uplink channel according to the result of uplink radio channel estimation from the reception processing unit 207 and the radio resource allocation request from the mobile station apparatus 1, and passes the scheduling result to the control data preparation unit 219 and the reception processing unit 207. In addition, if it is notified from the preamble detection unit 211 that the random access preamble has been detected, the uplink shared channel PUSCH is allocated, and the allocated uplink shared channel PUSCH and the preamble number (sequence number) are notified to the control data preparation unit 219.

When causing the mobile station apparatus 1 to perform random access, the random access management unit 221 checks whether or not there is a dedicated sequence (dedicated preamble) and, if there exists a dedicated sequence, selects a dedicated sequences, selects a random access channel position RACH available by the selected dedicated sequence, and passes, to the control data preparation unit 219, information of the downlink component carrier (component carrier number) and the C-RNTI (mobile station apparatus identification information) of the mobile station apparatus 1 corresponding to the selected dedicated sequence number and the random access channel number, and the selected dedicated sequence and the random access channel. If no dedicated sequence (dedicated preamble) exists, the dedicated sequence number, the random access channel number, and the component carrier number are set to fixed values (e.g., all having a value of 0) and passed to the control data preparation unit 219. Note that, the random access channel number specified here is information indicating the position of the random access channel which can be selected by the mobile station apparatus 1, for example, information of the position of the random access channel RACH allocated with a certain period (e.g., for each frame), for example.

The control data preparation unit 219 prepares the control data provided in the downlink control channel PDCCH and the control data provided in the downlink PDSCH. The control data preparation unit 219 prepares control data such as a control message including scheduling information, ACK/NACK of the uplink data, a broadcast information message including information on random access channel position and sequence information, and information on random access such as information on sequence groups, the preamble number and the transmission timing gap information, the random access response message including the scheduling information, a contention resolution message, a random access instruction message including the dedicated sequence number, the random access channel number, and the component carrier number.

Upon detecting a random access preamble in the random access channel RACH, the preamble detection unit 211 calculates the amount of transmission timing gap from the detected random access preamble, and reports the component carrier that detected the random access preamble, the detected preamble number (sequence number), and the amount of transmission timing gap to the scheduling unit 205.

Explanation of Operation

A wireless communication system is assumed which uses the random access procedure explained in FIGS. 3 and 4. In addition, a wireless communication system is assumed in which the base station apparatus 3 and the mobile station apparatus 1 explained in FIGS. 6 and 7 communicate using a plurality of component carriers.

EUTRA has been configured so that the base station apparatus 3 and the mobile station apparatus 1 communicate using a set of uplink component carriers and downlink component carriers, and the base station apparatus 3 instructs the mobile station apparatus 1 to perform random access on one downlink component carrier. If the downlink is congested, control data indicating an instruction of random access cannot be allocated to the downlink control channel PDCCH, and thus the control data indicating the random access instruction is transmitted in a delayed manner. Also with Advance-EUTRA, a similar phenomenon occurs if random access is instructed on a fixed downlink carrier as with the procedure of EUTRA, where a delay occurs in the course of performing random access until completing the uplink synchronization, and the delay further has an influence on data transmission from the base station apparatus 3.

Therefore, by transmitting control data indicating a random access instruction using any one of the component carriers allocated to the mobile station apparatus 1 and further indicating, within the control data indicating the random access, component carrier which performs random access, the base station apparatus 3 enables a component carrier other than that received the control data to perform random access, regardless of which component carrier the control data indicating the random access instruction is transmitted to.

Figure 10:
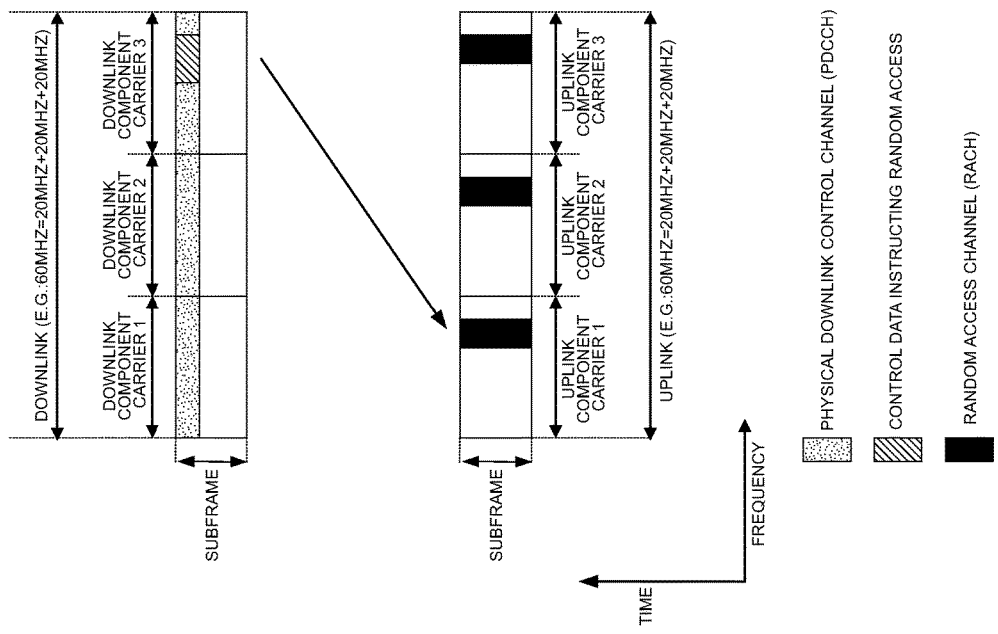
FIG. 10 illustrates a random access instruction according to an embodiment of the present invention.

For example, let us assume that the base station apparatus 3 has allocated three uplink and downlink component carriers to the mobile station apparatus 1 as shown in FIG. 10. Although the base station apparatus 3 wants to cause the mobile station apparatus 1 to perform random access with the uplink 1, the downlink component carrier 1 is congested and therefore the base station apparatus 3 transmits, to the mobile station apparatus 1 on the downlink component carrier 3, control data including information instructing random access on the uplink component carrier 1, and the mobile station apparatus 1 monitors a plurality of allocated component carriers and, if control data instructing random access on the downlink component carrier 3 is received, performs random access on the component carrier of the instructed uplink 1.

In this manner, even if the downlink control channel PDCCH of the downlink component carrier 1 is congested and control data indicating a random access instruction cannot be transmitted, the base station apparatus 3 can transmit it on the downlink control channel PDCCH of the downlink component carrier 3, and therefore no transmission delay of the control data indicating the random access instruction will occur. In addition, because it suffices to place the control data on any one of the allocated component carriers, the degree of freedom of scheduling the control data by the base station apparatus 3 increases. In addition, the mobile station apparatus 1 can also perform random access using a component carrier which is different from the downlink component carrier that received the control data.

Figure 11:
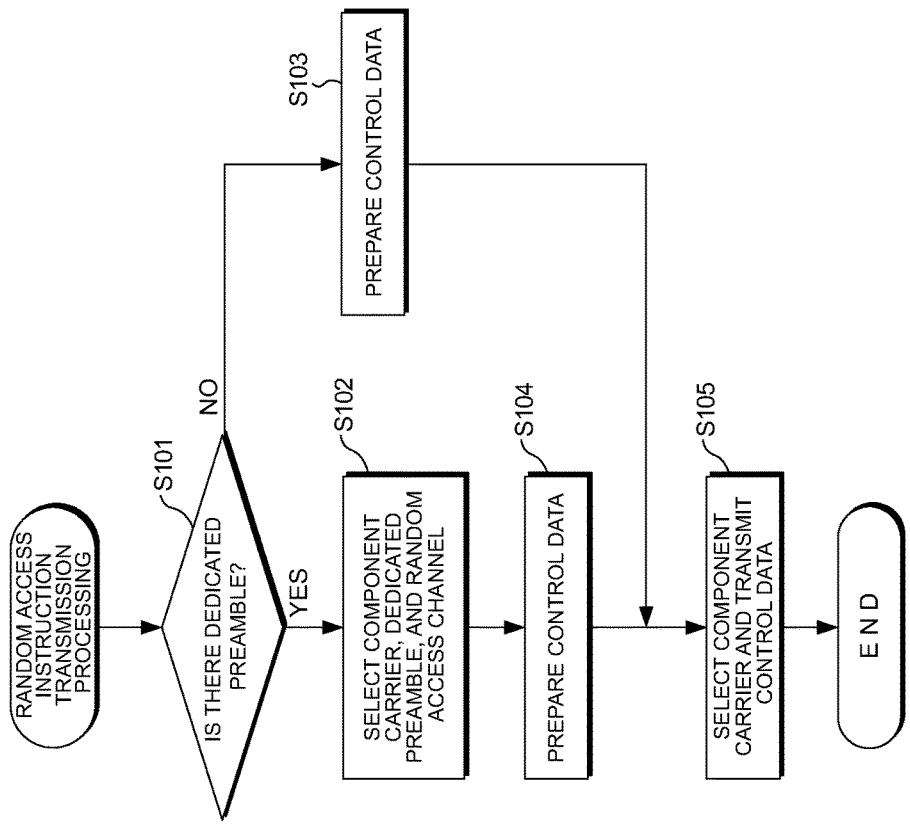
FIG. 11 is a flow chart illustrating an exemplary operation of a base station apparatus according to an embodiment of the present invention.
Figure 12:
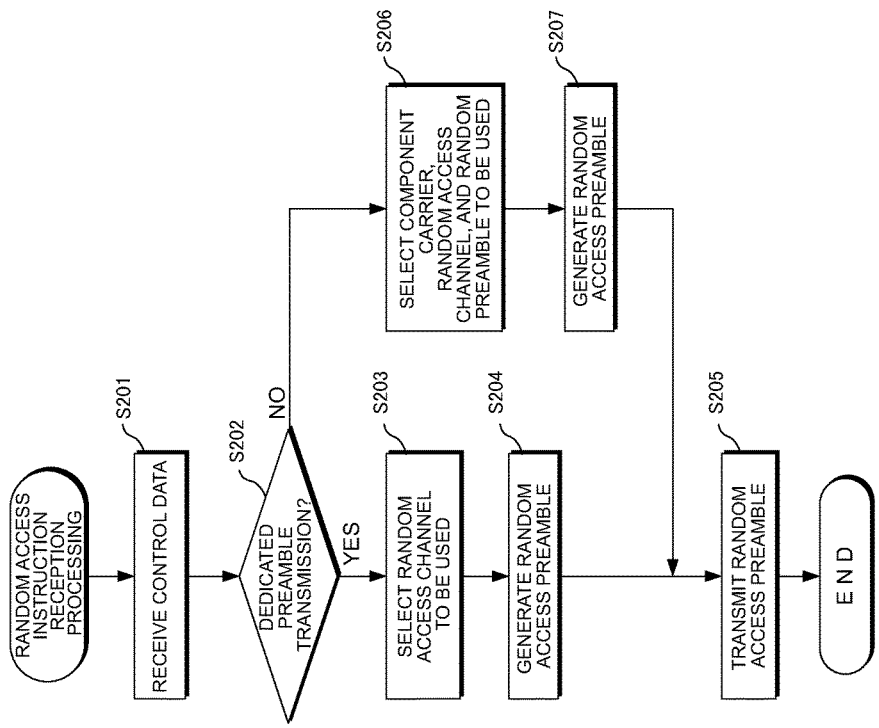
FIG. 12 is a flow chart illustrating an exemplary operation of a mobile station apparatus according to an embodiment of the present invention.

An operation of the base station apparatus 3 and the mobile station apparatus 1 will be explained. FIGS. 11 and 12 are flow charts respectively illustrating an exemplary operation of a random access instruction of the base station apparatus 3 and the mobile station apparatus 1 according to an embodiment of the present invention. The base station apparatus 3 is communicating the mobile station apparatus 1 using a plurality of component carriers. When causing the mobile station apparatus 1 to perform random access because it is necessary to adjust the uplink transmission timing of the mobile station apparatus 1 while communicating with the mobile station apparatus 1, the base station apparatus 3 checks whether or not there is an available dedicated preamble (dedicated sequence) among the component carriers allocated to the mobile station apparatus 1 (step S101).

If there are one or more vacant dedicated preambles, a dedicated preamble is selected from the vacant dedicated preambles, and a position of a random access channel RACH that can be used by the selected dedicated preamble is selected (step S102). Control data instructing random access is prepared (step S104), the control data including the number of the selected dedicated preamble, the position number of the selected random access channel RACH, and information of the downlink component carrier (component carrier number) corresponding to the selected dedicated preamble and random access channel RACH. Subsequently, a component carrier is selected from the component carriers allocated to the mobile station apparatus 1, and the prepared control data is placed in the downlink control channel PDCCH of the selected component carrier and transmitted to the mobile station apparatus 1 (step S105).

If there is no vacant dedicated preamble, fixed values (e.g., all having a value of 0 or 1) are set to the dedicated preamble number, the random access channel number, and the component carrier number in order to instruct random access with a random preamble (random sequence), and control data instructing random access is prepared (step S103). Subsequently, the prepared control data is placed in the downlink control channel PDCCH of any one of the component carriers allocated to the mobile station apparatus 1 and transmitted to the mobile station apparatus 1 (step S105). Here, the information indicating the random access instruction with a random preamble (random sequence) may be indicated by setting at least one of the dedicated preamble number, the random access channel position number, and the component carrier number to fixed values (e.g., all having a value of 0 or 1). In this manner, mobile station apparatus can identify dedicated preamble transmission and random preamble transmission by a same format of control data instructing random access.

Upon detecting a random access preamble in the random access channel RACH, the base station apparatus 3 measures the transmission timing gap from the detected random access preamble and, if the random access preamble has been generated from the dedicated preamble, transmits a random access response to the mobile station apparatus 1, the random access response having the dedicated preamble number and the transmission timing gap information included therein. If the random access preamble has been generated from the random preamble, the base station apparatus 3 allocates the uplink shared channel PUSCH and transmits a random access response to the mobile station apparatus 1, the random access response having the random preamble number, the transmission timing gap information, and the allocation information of the uplink shared channel PUSCH included therein.

The mobile station apparatus 1 monitors the downlink control channel PDCCH of a plurality of allocated component carriers. Upon detecting the control data in the downlink control channel PDCCH in one of the allocated component carriers, the mobile station apparatus 1 analyzes the control data and, if it is interpreted that the control data is a random access instruction (step S201), extracts the dedicated preamble number, the random access channel position number, and the component carrier number from the control data, and determines from the values of the dedicated preamble number, the random access channel position number, and the component carrier number whether the transmission is dedicated preamble transmission or random preamble transmission (step S202). It is determined to be a random preamble transmission if the dedicated preamble number, the random access channel position number, and the component carrier number are predetermined fixed values, whereas it is determined to be dedicated preamble transmission if the numbers are not fixed values.

In the case of dedicated preamble transmission, a random access channel position RACH for transmitting the random access preamble is selected from the information on random access broadcasted in the downlink component carrier specified by the component carrier number and the specified dedicated preamble number (step S203), a random access preamble is generated from the information on random access and the specified random access channel number (step S204), and the random access preamble generated at the selected random access channel RACH position is transmitted (step S205).

After transmitting the random access preamble, the mobile station apparatus 1 monitors, according to the Non-contention based random access procedure, the downlink control channel PDCCH of the downlink component carrier corresponding to the uplink component carrier which has transmitted the random access preamble in order to receive a random access response. Upon receiving a random access response from the base station apparatus 3, the mobile station apparatus 1 corrects the transmission timing gap and completes the random access procedure. If no random access response has been received from the base station apparatus 3, the mobile station apparatus 1 transmits random access preamble again, using the dedicated preamble number, the random access channel position number, and the component carrier number specified from the base station apparatus 3.

In the case of random preamble transmission, a downlink component carrier is selected from the allocated component carriers and, based on the information on random access broadcasted in the selected downlink component carrier, a random access preamble to be used and a random access channel RACH position for transmitting the random access preamble are selected (step S206), the random access preamble is generated from the information on random access and the selected random preamble (step S207), and the random access preamble generated in the selected random access channel RACH is transmitted (step S205). Here, the procedure of random preamble transmission may be such that, after selecting the random access channel RACH position to be used, the random preamble is selected based on the downlink information of the component carrier corresponding to the selected random access channel RACH.

After transmitting the random access preamble, the mobile station apparatus 1 performs processing of message 2 to messages 4, according to the Contention based random access procedure. If the processing of up to message 4 failed, the process is restarted from selection of the downlink component carrier and the random access preamble is transmitted again.

Here, a dedicated preamble refers to a preamble specified to the mobile station apparatus 1 by the base station apparatus 3, and dedicated preamble transmission refers to Non-contention based random access. In addition, a random preamble refers to a preamble selected by the mobile station apparatus 1, and random preamble transmission refers to Contention based random access.

In this manner, since the base station apparatus 3 can transmit, to the mobile station apparatus 1, the control data indicating random access on some component carrier in the component carriers allocated to the mobile station apparatus 1, it becomes possible to transmit the control data on another component even if one component carrier is congested, and therefore the control data indicating random access can be transmitted without transmission delay. Accordingly, the degree of freedom of scheduling by the base station apparatus 3 increases. In addition, it becomes possible for the mobile station apparatus 1 to perform random access with a component carrier which is different from the component carrier that received the control data.

In addition, when instructing random access with a random preamble (random sequence), the base station apparatus 3 may specify only the component carrier number and sets at least one the dedicated preamble number and the random access channel position number to fixed values (e.g., all having a value of 0 or 1), prepare control data instructing random access and transmit it to the mobile station apparatus 1. In this case, the mobile station apparatus 1 determines random preamble transmission from the values of the dedicated preamble number and the random access channel position number, selects a random preamble to be used and a random access channel RACH position to be used, based on the information on random access of the downlink component carrier specified by the base station apparatus 3, and transmits the random access preamble to the base station apparatus 3.

In this manner, even if there is no dedicated preamble and the random preamble must be used, the base station apparatus 3 can determine the usage situation of the random access channel RACH of each component carrier and can notify the mobile station apparatus 1 of a component carrier which is using a smaller amount of the random access channel RACH, suppressing the possibility of contention among the mobile station apparatuses 1 thereby.

When indicating a random access instruction in the downlink control channel PDCCH in EUTRA, random access instruction is indicated by setting the format flag to 1, setting the radio resource block allocation flag to 0, setting all n bits of the radio resource allocation information set to 1, and setting one bit of the transmission power command and the retransmission information to 0, with the remaining 10 bits indicating the 6-bit preamble number and the 4-bit random access channel number, for control data including a 1-bit format flag, a 1-bit radio resource block allocation flag, an n-bit radio resource allocation information (n varies according to the system band of the base station apparatus 3), a 5-bit modulation coding method, a 3-bit retransmission control process number, a 1-bit data indicator, a 2-bit retransmission information, and a 2-bit transmission power command.

The control data indicating a random access instruction of the present invention indicates the random access instruction by setting the format flag to 1, setting the radio resource block allocation flag to 0, and setting all the n bits of the radio resource allocation information to 1, with the remaining 13 bits indicating the 6 bits of the preamble number, the 4 bits of a random access channel number, and the 3 bits of the component carrier number.

In this manner, random access indicating a component carrier number can be instructed without newly adding a format of control data.

In the embodiment of the present invention, although an explanation has been given for a case where the number of downlink component carriers and the number of uplink component carriers are the same, the same goes for the case where the number of downlink component carriers is different from the number of uplink component carriers (i.e., the number of downlink component carriers>the number of uplink component carriers).

Although an embodiment of the present invention has been explained in detail above referring to the drawing, specific configurations are not limited to those described above and various changes in design can be made in a range without deviating from the spirit of the invention.

REFERENCE NUMERALS 1, 1-1 to 1-3 mobile station apparatus
3 base station apparatus
101, 213 radio unit
105, 207 reception processing unit
109, 205 scheduling unit

The invention claimed is:

1. A base station apparatus comprising:
a scheduling circuitry configured to and/or programmed to:
select one component carrier from among a plurality of component carriers allocated by said base station, apparatus to a mobile station apparatus, a preamble number, and random access channel information, wherein said base station apparatus receives a random access preamble indicated by said preamble number on a random access channel indicated by said random access channel information of said one component carrier, through a non-contention based random access procedure, in a case that at least one predetermined condition including a condition that said preamble number is a dedicated preamble number different from zero is satisfied, and
prepare control data of a physical downlink control channel (PDCCH) (a) causing said mobile station apparatus to perform a random access procedure, (b) including component carrier information constituted by only 3 bits of fixed length, said 3 bits specifying said one component carrier, and (c) including said preamble number, and said random access channel information; and
a radio circuitry configured to and/or programmed to transmit said control data to said mobile station apparatus using any one of the plurality of said component carriers.

2. Said base station apparatus according to claim 1, wherein said control data indicates an instruction of transmission of said random access preamble.

3. A mobile station apparatus comprising:
control data circuitry configured to and/or programmed to extract component carrier information constituted by only 3 bits of fixed length, a preamble number, random access channel information, and random access information from control data of a physical downlink control channel (PDCCH) transmitted by a base station apparatus;
random access management circuitry configured to and/or programmed to select, with reference to said random access information and said random access channel information, a random access channel belonging to one component carrier of a plurality of component carriers allocated by said base station apparatus, wherein said 3 bits specifying said one component carrier,
random access preamble circuitry configured to and/or programmed to generate a random access preamble with reference to said random access information and said preamble number with a value different from zero; and
radio circuitry configured to and/or programmed to transmit said random access preamble on said random access channel of said one component carrier,
in a case that at least one predetermined condition including a condition that said preamble number is a dedicated preamble number different from zero is satisfied,
(i) said random access preamble circuitry generating, as said random access preamble, a random access preamble indicated by said dedicated preamble number, and
(ii) said radio circuitry transmitting said random access preamble indicated by said dedicated preamble number, through a non-contention based random access procedure.

4. The mobile station apparatus according to claim 3, wherein said random access preamble circuitry selects one preamble group from a plurality of preamble groups, at least based on path loss between said mobile station apparatus and said base station apparatus, and said random access preamble belongs to said one preamble group.

5. A processing method for a base station apparatus, said processing method comprising:
selecting one component carrier from among a plurality of component carriers allocated by said base station apparatus to a mobile station apparatus, a preamble number, and a random access channel information, wherein said base station apparatus receives a random access preamble indicated by said preamble number on a random access channel indicated by said random access channel information of said one component carrier, through a non-contention based random access procedure, in a case that at least one predetermined condition including a condition that said preamble number is a dedicated preamble number different from zero is satisfied;
preparing control data of a physical downlink control channel (PDCCH) (a) causing said mobile station apparatus to perform a random access procedure, (b) including component carrier information constituted by only 3 bits of fixed length, said 3 bits specifying said one component carrier, and (c) including said preamble number with a value different from zero, and said random access channel information; and
transmitting said control data to said mobile station apparatus using any one of the plurality of said component carriers.

6. Said processing method according to claim 5, wherein said control data indicates an instruction of transmission of said random access preamble.

7. A processing method for a mobile station apparatus, said processing method comprising:
extracting component carrier information constituted by only 3 bits of fixed length, a preamble number, random access channel information and random access information from control data of a physical downlink control channel (PDCCH) transmitted by a base station apparatus;
selecting, with reference to said random access information and said random access channel information, a random access channel belonging to one component carrier from among a plurality of component carriers, wherein said 3 bits specifying said one component carrier;
generating a random access preamble with reference to said random access information and said preamble number with a value different from zero; and transmitting said random access preamble on said random access channel of said one component carrier, in a case that at least one predetermined condition including a condition that said preamble number is a dedicated preamble number different from zero is satisfied, (i) said random access preamble circuitry generating, as said random access preamble, a random access preamble indicated by said dedicated preamble number, and (ii) said radio circuitry transmitting said random access preamble indicated by said dedicated preamble number, through a non-contention based random access procedure.

8. The processing method according to claim 7, said processing method further comprising: selecting one preamble group from a plurality of preamble groups, at least based on path loss between said mobile station apparatus and said base station apparatus, wherein said random access preamble belongs to said one preamble group.

9. A processor mounted in a mobile station apparatus, said processor comprising:

control data circuitry configured to and/or programmed to extract component carrier information constituted by only 3 bits of fixed length, a preamble number, random access channel information, and random access information from control data of a physical downlink control channel (PDCCH) transmitted by a base station apparatus;

random access management circuitry configured to and/or programmed to select, with reference to said random access information and said random access channel information, a random access channel belonging to one component carrier of a plurality of component carriers, wherein said 3 bits specifying said one component carrier;

random access preamble circuitry configured to and/or programmed to generates a random access preamble with reference to said random access information and said preamble number; and radio control circuitry configured to and/or programmed to transmit said random access preamble on said random access channel of said one component carrier, in a case that at least one predetermined condition including a condition that said preamble number is a dedicated preamble number different from zero is satisfied, (i) said random access preamble circuitry generating, as said random access preamble, a random access preamble indicated by said dedicated preamble number, and (ii) said radio circuitry transmitting said random access preamble indicated by said dedicated preamble number, through a non-contention based random access procedure.

10. The processor according to claim 9, wherein said random access preamble circuitry selects one preamble group from a plurality of preamble groups, at least based on path loss between said mobile station apparatus and said base station apparatus, and said random access preamble belongs to said one preamble group.

* * * * *